US008727582B2

(12) United States Patent
Brown et al.

(10) Patent No.: US 8,727,582 B2
(45) Date of Patent: May 20, 2014

(54) RECESSED LIGHTING FIXTURE WITH ALIGNMENT ENHANCEMENTS AND METHODS FOR MOUNTING SAME

(75) Inventors: Jeffrey Alan Brown, Austell, GA (US); Shane Elizabeth Bode, Smyrna, GA (US); Leslie Charles King, Loganville, GA (US); Mark Charles Major, Lithonia, GA (US); Jon Dale Hinnefeld, Conyers, GA (US)

(73) Assignee: ABL IP Holding LLC, Conyers, GA (US)

( * ) Notice: Subject to any disclaimer, the term of this patent is extended or adjusted under 35 U.S.C. 154(b) by 1381 days.

(21) Appl. No.: 11/776,639

(22) Filed: Jul. 12, 2007

(65) Prior Publication Data

US 2008/0192490 A1 Aug. 14, 2008

Related U.S. Application Data

(60) Provisional application No. 60/901,626, filed on Feb. 13, 2007.

(51) Int. Cl.

| | |
|---|---|
| ***F21V 15/00*** | (2006.01) |
| ***H02G 3/08*** | (2006.01) |
| ***A47H 1/00*** | (2006.01) |

(52) U.S. Cl.

USPC .............. 362/364; 220/3.3; 220/3.7; 248/327

(58) Field of Classification Search

USPC ................ 220/3.3, 3.7, 3.8, 3.9, 3.2, 3.5, 3.6, 220/4.02; 362/362–375; 248/327, 343, 340; 174/57, 58, 535; 411/528, 529, 539, 411/991, 994, 433

See application file for complete search history.

(56) References Cited

U.S. PATENT DOCUMENTS

| | | | |
|---|---|---|---|
| 2,227,655 A | 1/1941 | Levy | |
| 2,232,276 A | 2/1941 | Schepmoes | |
| D165,259 S | 11/1951 | Baker | |
| 2,647,985 A | 8/1953 | Biller | |
| 2,675,466 A | 4/1954 | Baker | |
| 2,717,955 A | 9/1955 | Schwemmer et al. | |
| 2,744,191 A | 5/1956 | Renaud et al. | |
| 2,826,684 A | 3/1958 | Baker | |
| D183,896 S | 11/1958 | Moser | |
| 3,185,833 A | 5/1965 | Blitzer, Jr. | |
| 3,293,428 A | 12/1966 | Herman | |
| 3,300,638 A | 1/1967 | Sloan | |
| 3,303,338 A | 2/1967 | Lyon | |

(Continued)

FOREIGN PATENT DOCUMENTS

| | | |
|---|---|---|
| DE | 3420645 A1 | 5/1985 |
| DE | 29913554 U1 | 3/2000 |
| JP | 2004-111284 | 4/2004 |

*Primary Examiner* — Bryon Gehman
*Assistant Examiner* — Shawn M Braden
(74) *Attorney, Agent, or Firm* — Kilpatrick Townsend & Stockton, LLP

(57) ABSTRACT

Recessed-lighting fixtures having features to facilitate alignment between adjacent fixtures. According to one embodiment of the present invention, alignment means are provided on downwardly directed walls of a recessed lighting tray, ensuring alignment between adjacent fixtures. In another embodiment, apertures on the tray permit relative movement between the tray and a recessed lighting pail, allowing the tray to be quickly and easily repositioned relative to the pan. In yet another embodiment, cavities are provided on the tray for insertion of the trim assembly's alignment tabs to facilitate alignment between the trim assembly and the tray,

7 Claims, 6 Drawing Sheets

(56) References Cited

U.S. PATENT DOCUMENTS

| | | | | |
|---|---|---|---|---|
| 3,420,995 | A | 1/1969 | Dunckel | |
| 3,609,338 | A | 9/1971 | Kripp | |
| 3,786,602 | A | 1/1974 | Wilkin | |
| 3,883,732 | A | 5/1975 | Peterson et al. | |
| 3,922,073 | A | 11/1975 | Schwartz | |
| 4,175,360 | A | 11/1979 | Mulvey | |
| 4,488,205 | A | 12/1984 | Quiogue | |
| 4,569,458 | A * | 2/1986 | Horsley | 220/3.6 |
| 4,972,339 | A * | 11/1990 | Gabrius | 362/366 |
| D386,804 | S | 11/1997 | Engel | |
| D399,586 | S | 10/1998 | Ranieri et al. | |
| D400,281 | S | 10/1998 | Kerr | |
| D409,325 | S | 5/1999 | Holder et al. | |
| D411,031 | S | 6/1999 | Conn et al. | |
| 5,927,843 | A | 7/1999 | Haugaard et al. | |
| 5,988,836 | A | 11/1999 | Swarens | |
| 6,053,625 | A | 4/2000 | Bowker | |
| 6,059,422 | A | 5/2000 | Fischer et al. | |
| 6,062,704 | A | 5/2000 | Holder | |
| 6,079,856 | A | 6/2000 | Prestier | |
| 6,116,749 | A | 9/2000 | Quiogue et al. | |
| 6,188,022 | B1 * | 2/2001 | He | 174/58 |
| 6,276,818 | B1 | 8/2001 | Wang | |
| 6,357,891 | B1 | 3/2002 | Newbold et al. | |
| 6,565,236 | B1 | 5/2003 | Davis, Jr. | |
| D477,891 | S | 7/2003 | Fritze et al. | |
| 6,585,389 | B2 * | 7/2003 | Bonazzi | 362/147 |
| 6,588,543 | B1 * | 7/2003 | Tchilinguirian | 181/150 |
| 6,652,124 | B2 | 11/2003 | Schubert et al. | |
| 6,692,139 | B2 | 2/2004 | Kotovsky | |
| 6,755,550 | B1 | 6/2004 | Lackey | |
| 6,755,559 | B2 * | 6/2004 | Wang et al. | 362/147 |
| D496,121 | S | 9/2004 | Santoro | |
| 6,838,618 | B2 | 1/2005 | Newbold et al. | |
| 6,843,580 | B2 | 1/2005 | Fischer et al. | |
| D504,741 | S | 5/2005 | Ferrari | |
| 6,948,831 | B1 | 9/2005 | Naqvi | |
| 6,969,182 | B2 | 11/2005 | Kotovsky | |
| 7,029,153 | B2 | 4/2006 | Rhee | |
| 7,148,420 | B1 * | 12/2006 | Johnson et al. | 174/58 |
| 7,478,931 | B2 * | 1/2009 | Miletich et al. | 362/364 |
| 7,571,570 | B2 * | 8/2009 | Ziobro et al. | 52/19 |
| 2001/0040809 | A1 | 11/2001 | Sools et al. | |
| 2002/0005019 | A1 | 1/2002 | Trilli et al. | |
| 2002/0163801 | A1 | 11/2002 | Fischer et al. | |
| 2003/0012017 | A1 | 1/2003 | Reggiani | |
| 2003/0123252 | A1 | 7/2003 | Cercone et al. | |
| 2004/0090772 | A1 | 5/2004 | Newbold et al. | |
| 2005/0002184 | A1 | 1/2005 | Kotovsky | |
| 2005/0057922 | A1 | 3/2005 | Herst et al. | |
| 2006/0158873 | A1 | 7/2006 | Newbold et al. | |
| 2008/0025031 | A1 * | 1/2008 | Wronski et al. | 362/365 |

* cited by examiner

RECESSED LIGHTING FIXTURE WITH ALIGNMENT ENHANCEMENTS AND METHODS FOR MOUNTING SAME

This application claims priority to U.S. application Ser. No. 60/901626 filed on Feb. 13, 2007, the entire contents of which are hereby incorporated by this reference.

FIELD OF THE INVENTION

This invention relates to recessed lighting fixtures having features for facilitating alignment between adjacent fixtures.

BACKGROUND OF THE INVENTION

Recessed lighting fixtures are well known in the art. Such fixtures are often intended to be positioned in aligned rows in a ceilings However, alignment of such fixtures is often difficult. Oftentimes installers are forced to "eyeball" the fixtures during installation. Such imprecise alignment means undoubtedly results in deviation of the fixtures from the intended centerline of tie fixture row. While the deviation between two adjacent fixtures may not alone be noticeable, continued deviation between adjacent fixtures in the row is readily noticeable when the row is viewed in its entirety.

Moreover, recessed lighting fixtures are installed prior to installation of the ceiling. During ceiling installation, the fixtures have a tendency to get bumped or otherwise moved out of alignment with the other fixture in the row. No means currently exist to allow an installer to re-align a misaligned recessed lighting fixture without removing the ceiling panel to access the fixture.

Thus, there exists a need for means by which to align more accurately recessed lighting fixtures relative to each other both during initial installation and after the ceiling is installed.

SUMMARY OF THE INVENTION

This invention relates generally to recessed-lighting fixtures having, features to facilitate alignment between adjacent fixtures. In one embodiment of the present invention, the recessed-lighting fixture includes a pail and a tray, the tray being mounted to the pan. The tray includes laterally extending walls and downwardly directed walls that extend through an opening in the pan. Alignment means, such as a notch, are provided on at least one of the downwardly directed walls. During installation, an installer can align the notches on the trays of adjacent fixtures to ensure alignment between the adjacent fixtures.

The laterally extending walls of the tray may be provided with apertures through which fastening devices are positioned to secure the tray to the pan. The apertures are preferably sized to have dimensions larger than- the fastening devices. In this way, when the fastening devices are loosened, the tray may move relative to the pan to allow for re-positioning of the tray. Such a feature is particularly useful if a tray is knocked out of alignment after the ceiling has been installed. The installer need only reach through the central opening in the pan, loosen the fastening device, re-position the tray, and re-secure the fastening device to lock the tray in position.

The recessed-lighting fixture may also include one outer housing and a trim assembly. The trim assembly may include alignment tabs that at least partially engage cavities formed at the intersection of adjacent downwardly directed walls of the tray. When the trim assembly is positioned in the tray, engagement of the alignment tabs in the cavities ensures alignment between the trim assembly and the tray.

DETAILED DESCRIPTION OF THE DRAWINGS

Figure 1:
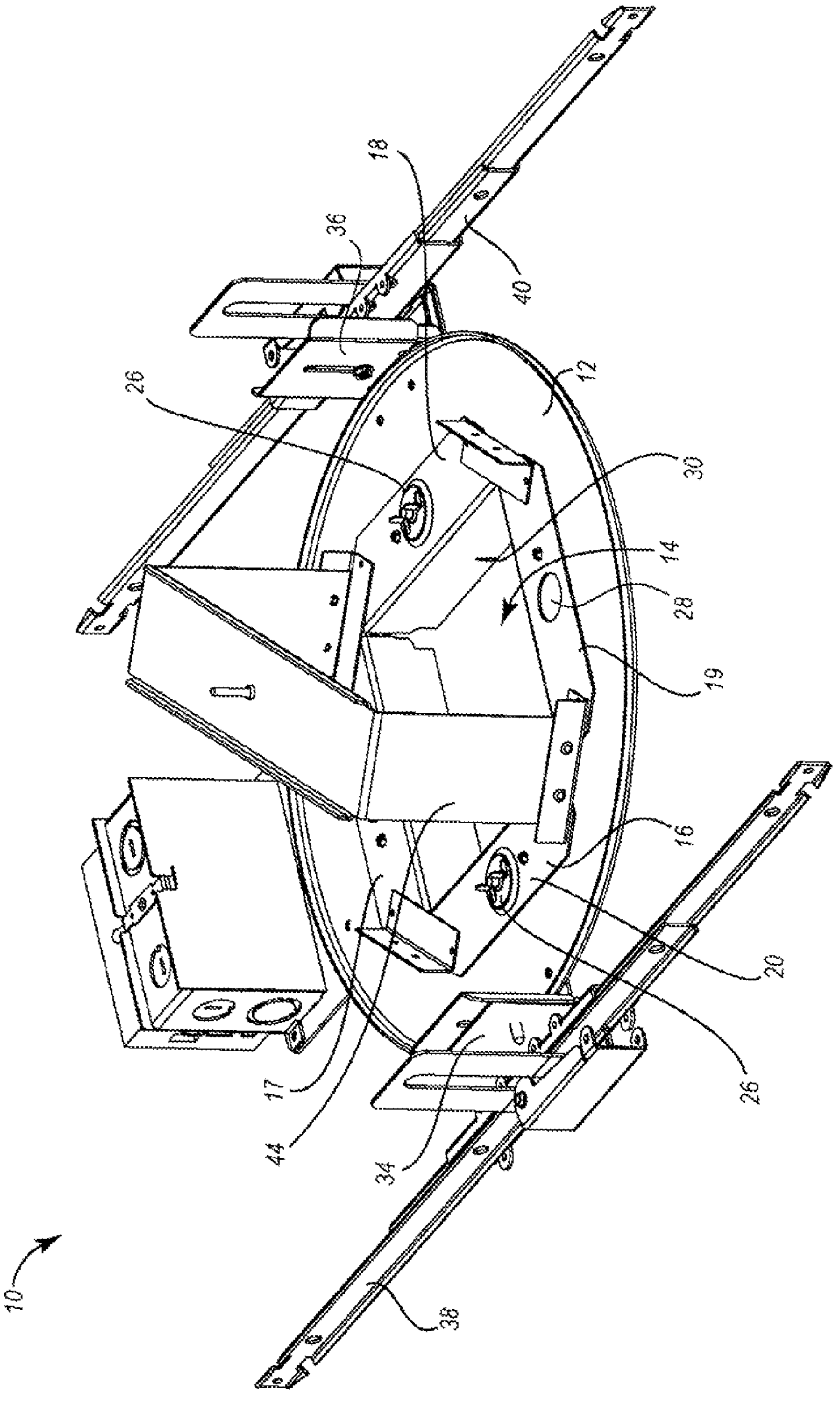
FIG. 1 is a top perspective view of one embodiment of a partially assembled recessed lighting fixture of this invention.

FIG. 1 illustrates one embodiment of a partially-assembled recessed lighting fixture 10 of this invention. A square recessed lighting fixture 10 is illustrated for purposes of discussion. However, one of skill in the art will recognize that the alignment features disclosed herein may also be used on recessed lighting fixtures of other shapes.

Figure 2:
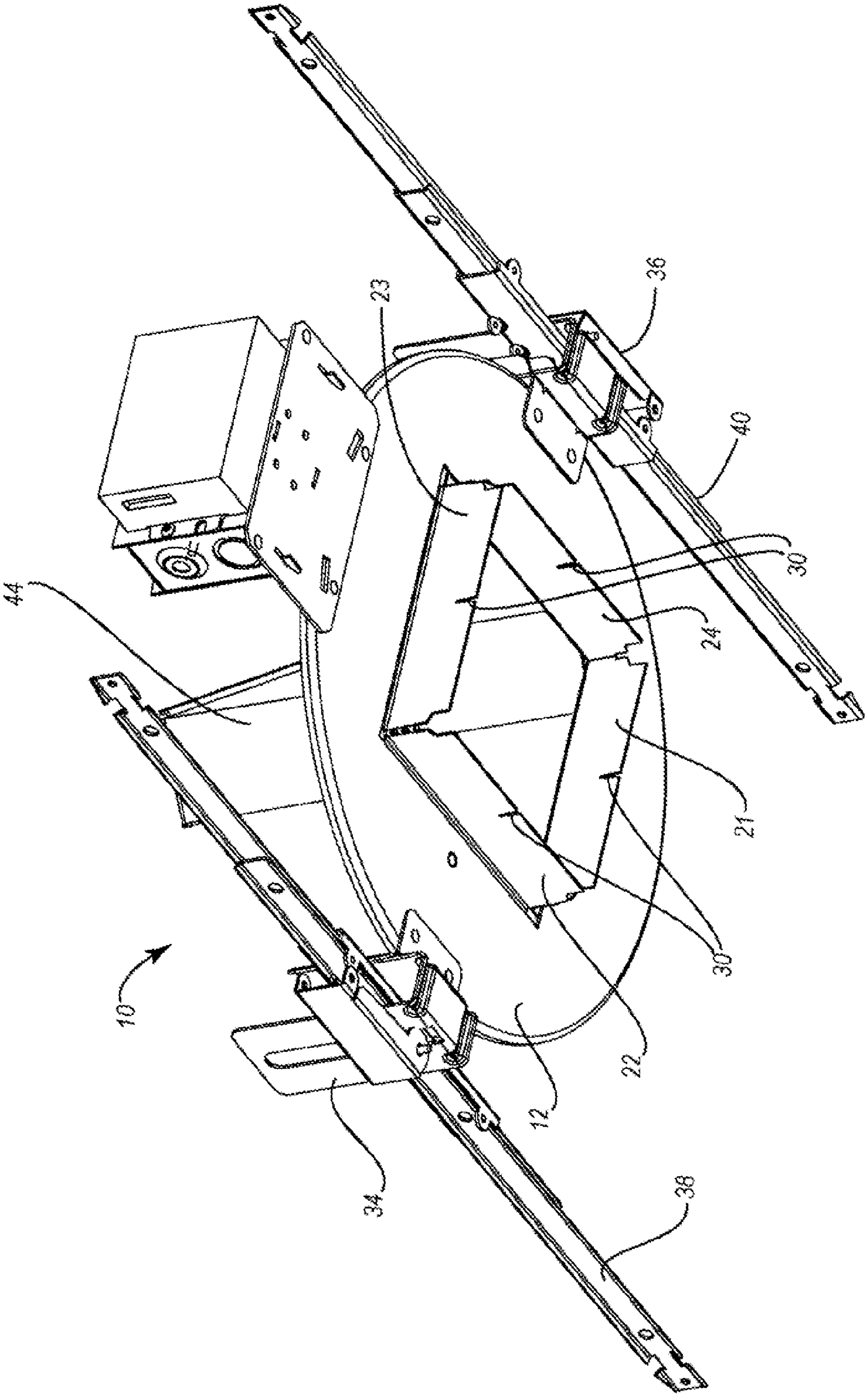
FIG. 2 is a bottom perspective view of the embodiment of FIG. 1.
Figure 3:
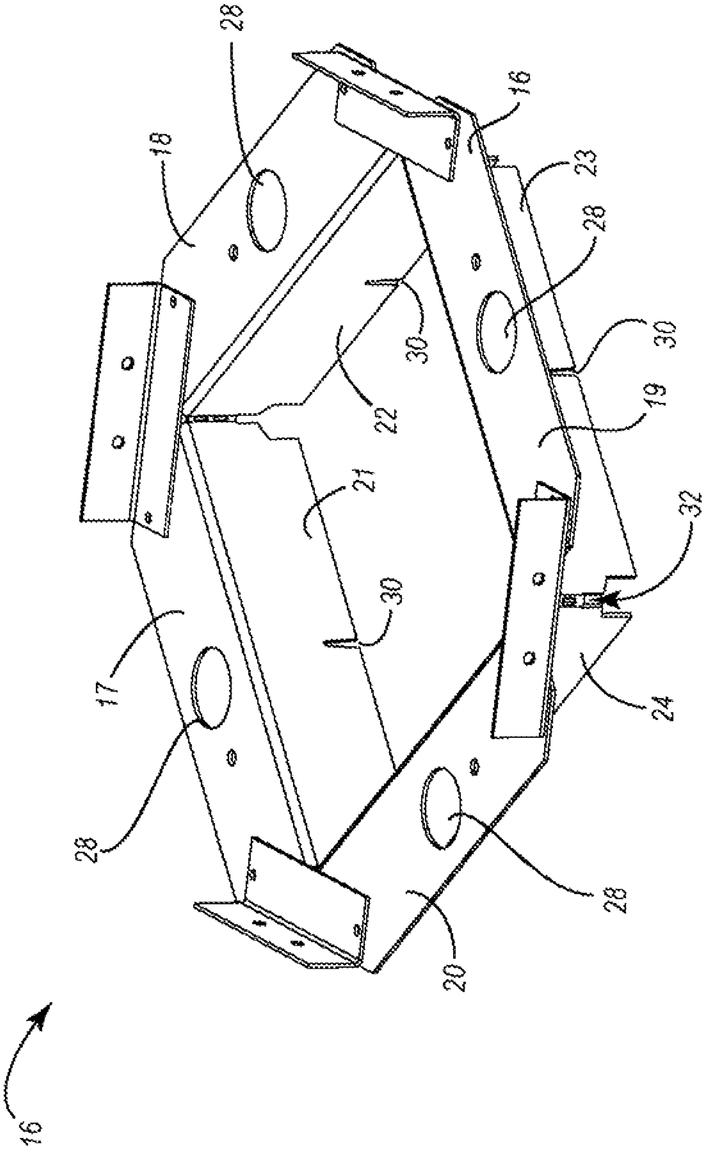
FIG. 3 is a perspective view of one embodiment of the tray of this invention.
Figure 7:
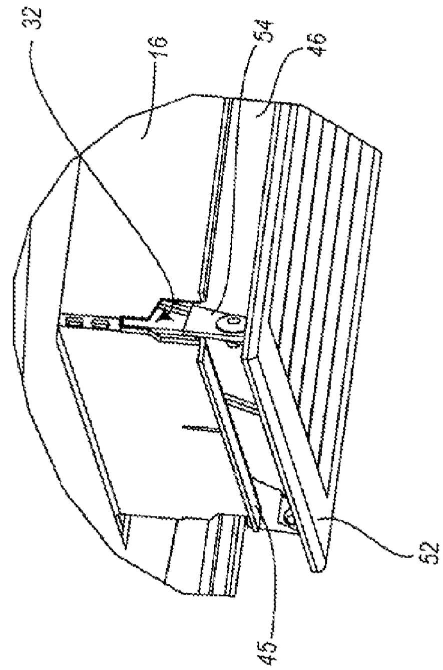
FIG. 7 is an enlarged section view taken at inset circle 7 in FIG. 6.

The fixture 10 includes a pan 12 having an opening 14 in which a tray 16 is mounted. The tray 16 and pan 12 may be made from any suitably rigid material, including metal, wood or plastic and are preferably metal and more preferably steel. As best seen in FIG. 3, the tray 16 has four lateral walls 17-20 that, when the tray 16 is mounted on the panel 12, can be, but do not have to be) positioned substantially flush with the upper surface of the pan 12. The tray 16 also includes four downwardly directed wails 21-24 that extend through the pan opening 14 as shown in FIG. 2. However, as one skilled in the art would know, the tray 16 is not limited to having only four lateral and four downwardly directed walls; the tray may have any acceptable combination of lateral and downwardly directed walls. The downwardly directed walls 21-24 may be, but do not have to) be, substantially perpendicular to the lateral tray walls 17-20. At least one cavity, 32 (best seen In FIGS. 3 and 7) is preferably, but not necessarily, provided at the intersection of at least two (and preferably all) downwardly directed walls 21-24.

The tray 16 is mounted on the pan 12 with a fastening device 26. In the embodiment of FIG. 1, screws, washers, and nuts are used to secure the tray 16 to the pan 12. However, one of skill in the art will understand that any type of fastener may be used and preferably, but not necessarily, is of a type that is capable of being repeatedly fastened and unfastened. The tray 16 includes an aperture 28 through which a fastening device 26 is inserted. As shown if FIG. 1, the fastening device 26 includes a screw inserted through the aperture 28 and stabilized using a washer and a nut. The aperture 28 is preferably shaped to have dimensions larger than the fastening device 26. This allows relative movement between the tray 16 and the pan 12 when the fastening device 26 is loosened, as is discussed in more detail below. While circular apertures 28 are illustrated in FIGS. 1 and 3, one of skill in the art will understand that an aperture of any shape may be used as long is it permits relative movement between the tray 16 and the pan 12. Moreover, while four aperture/fastening devices may prove useful in a number of installations, any number of aperture/fastening devices may be provided or used in tray 16 as long as they serve the alignment purposes discussed below.

FIG. 2 is a bottom perspective view of fixture 10. The edges of the downwardly directed walls 21-24 distal the pan are provided with an alignment means 30. FIG. 2 illustrates the alignment means as notches 30 that extend up at least a portion of the walls. However, the alignment means 30 is not limited to notches. Rather, one skilled in the art will understand that any means that provides a reference point for alignment between adjacent fixture, such as an aperture, groove, or other reference means, would suffice. While every wall need not be provided with alignment means 30, it i preferable (but not required) that at least two opposing walls be so provided.

During fixture 10 installation and prior to ceiling installation, the pan/tray assembly is suspended between adjacent ceiling joists in a conventional way (such as through the use of mounting strictures 34, 36 with or without the use of suspension bars 38, 40). The first fixture installed in a fixture row becomes the first point of reference. When the installer installs a second fixture in the row, he can align the second fixture relative to the first fixture using alignment means 30. By using a laser, alignment string, chalk line, etc., the installer can ensure that the alignment means 30 of the second fixture align with the alignment means 30 of the first fixture. Using the notches 30 of the previously installed fixture(s) when installing a subsequent fixture reduces (if not eliminates) positional deviations of adjacent fixtures and allows the installer to maintain straightness along the row. This eliminates the time-consuming task of the installer "eyeballing" the fixtures down the row and readjusting them individually if he detects misalignment.

Figure 4:
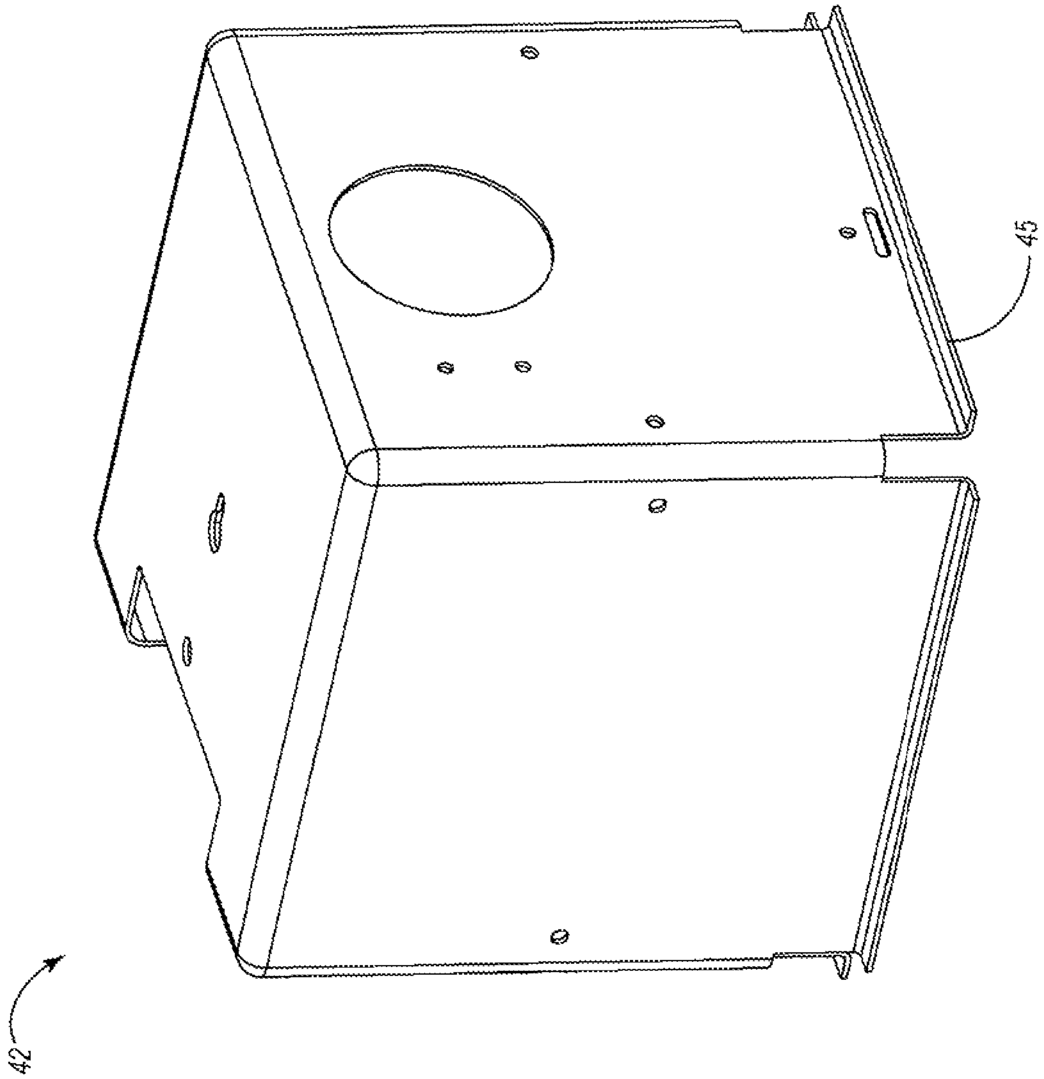
FIG. 4 is a perspective view of one embodiment of the outer housing of this invention.

After the pan/tray assembly is positioned in the ceiling, the outer housing 42 (see FIG. 4) is inserted through the pan opening 14 to fit between the downwardly directed walls of the tray 21-24 and secured in the assembly via connection (such as with a screw) to the yoke 44, as is conventionally done. However, other means of securing the outer housing 42 to the tray are included in this invention. The outer housing 42 may be made from any material and may be made from a metal such as aluminum. The outer housing 42 includes outwardly extending flanges 45. The ceiling is installed relative to the fixture so as to rest atop flanges 45. Note that the outer housing 42 may be installed in the fixture before or after ceiling installation.

As mentioned previously, during ceiling installation a fixture may be knocked out of alignment with the fixture row. In such cases, the installer need not remove the ceiling to reposition the tray. Rather, the installer need only reach through the pan opening 14, loosen the fastening devices 26, and reposition the tray 16 (without the outer housing 42 positioned therein). Because the apertures 28 in the tray 16 are larger than the fastening means 26 positioned in the apertures 28, the tray 16 may move laterally relative to the pan 12 to allow for such repositioning. Such movement of the tray 16 is often, but not necessarily in a plane substantially parallel to the plane in which the pan 12 extends. When re-alignment is accomplished (such as by reference to alignment means 30), the fastening device 26 need only be re-secured to fix the fixture in an aligned position. Note that the fastening devices 26 may be used in this way during initial installation of the fixture as well.

Figure 5:
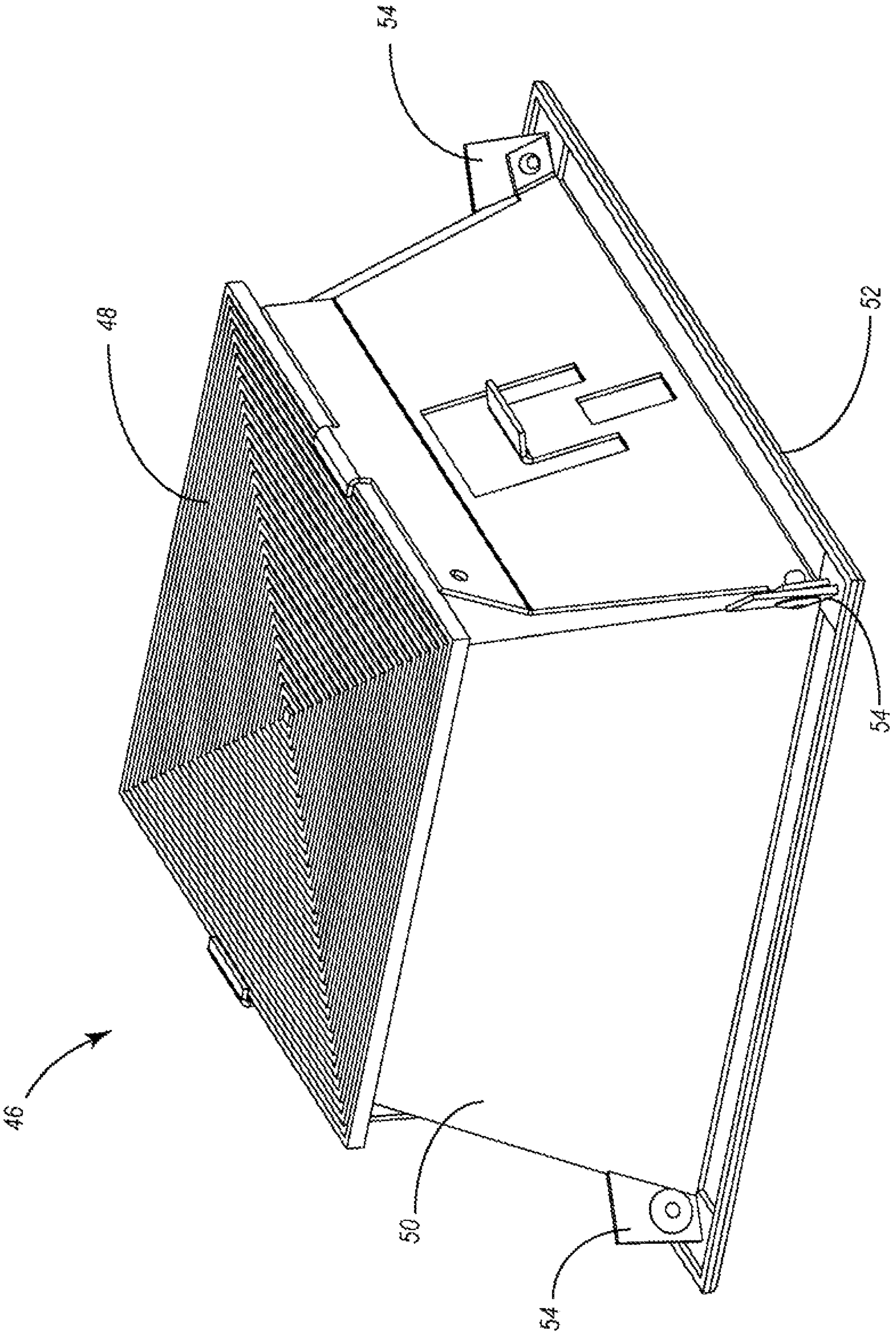
FIG. 5 is a perspective view of one embodiment of the trim assembly of this invention.

After calling installation, a trim assembly is positioned in the fixture. FIG. 5 illustrates one embodiment of a trim assembly but one of skill in the art will recognize that trim assemblies having different geometries and features may be used. The trim assembly 46 includes a lens 48 secured (such as with brackets or any other mechanical retention means) to the trim body 50. The trim assembly 46 includes ledges 52 and alignment tabs 54, both or either of which can be integrally-formed with) or fixedly attached to, the trim body 50. The trim body 50 may be made from any material having suitable rigidity, including metal, wood and plastic, and is preferably molded from a polymer material.

Figure 6:
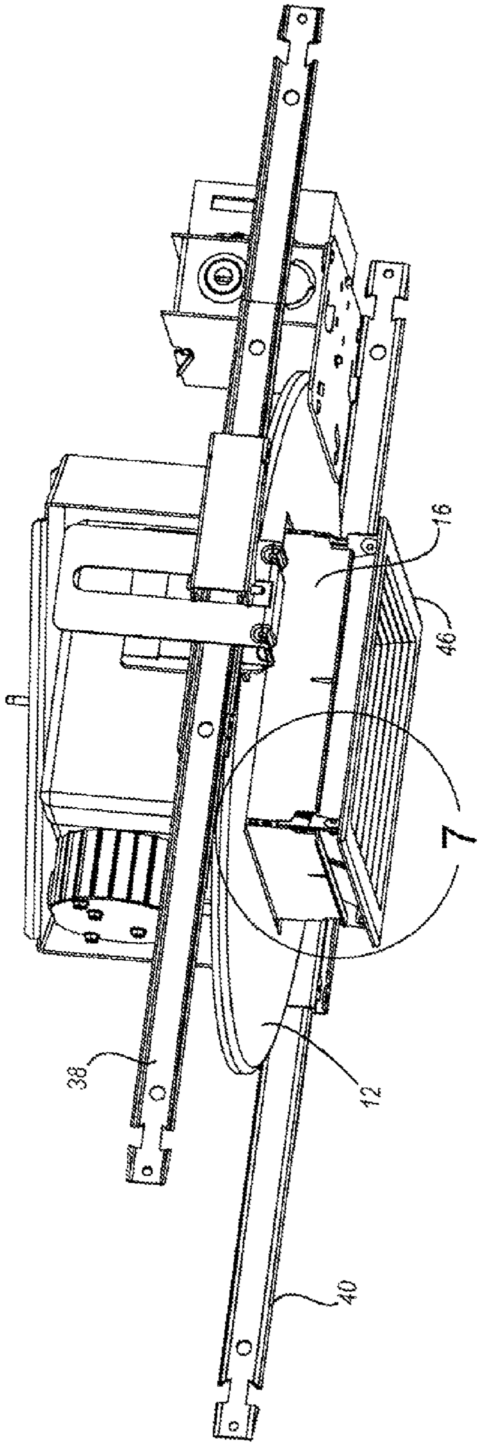
FIG. 6 is a perspective view of one embodiment of the outer housing and trim assembly of FIGS. 4 and 5, respectively, positioned in a lighting fixture of this invention.

The trim assembly 46 is inserted into the outer housing 42 (see FIGS. 6 and 7) and secured therein using conventional mechanical trim retention means, such as springs so positioned, the ledges 52 cover and thereby conceal flanges 45 of the outer housing 42 to impart a polished appearance to the installation. Moreover, when the trim assembly 46 is installed, the alignment tabs 54 engage the tray 16 to ensure alignment between the trim assembly 46 and the tray 16. Because the tray 16 is accurately aligned) the trim assembly 46 will necessarily also be aligned when mated with the tray 16.

The foregoing description of the exemplary embodiments of the invention has been presented only far the purposes of illustration and description and is not intended to be exhaustive or to limit the invention to the precise forms disclosed. Many modifications and variations are possible in light of the above teaching. The embodiments were chosen arid described in order to explain the principles of the invention and their practical application so as to enable others skilled in the art to utilize the invention and various embodiments and with various modifications as are suited to the particular use contemplated. Alternative embodiments swill become apparent to those skilled in tile art to which the present invention pertains without departing from its spirit and scope.

We claim:

1. A recessed lighting fixture assembly, comprising:

a. a pan extending in a first plane and having a pan opening;

b. a tray positioned at least partially within the pan opening, the tray comprising:

i. a plurality of first walls extending in a first direction, at least one of the first walls comprising at least two apertures, each aperture configured to receive a fastener;

ii. a plurality of second walls extending in a second direction different from the first direction, at least one of the second walls comprising at least one notch that extends along a portion of the at least one second wall; and iii. at least one cavity formed at the intersection of an adjacent pair of second walls, wherein the tray is adjustable relative to the pan in a second plane parallel to the first plane from a first position to a second position, wherein each aperture is sized to permit movement of the tray relative to the pan in the second plane in any direction relative to the first plane from the first position to the second position when at least a portion of each fastener is positioned within each aperture, and wherein the tray is securable in the second position; and c. a trim assembly positioned at least partially within the pan opening and comprising at least one alignment tab positionable at least partially within the at least one cavity so as to engage the trim assembly with the tray.

2. The recessed lighting fixture assembly of claim 1, further comprising a plurality of mounting structures secured to the pan for mounting the lighting fixture assembly to adjacent ceiling joists.

3. The recessed lighting fixture assembly of claim 1, further comprising a plurality of mounting structures secured to the pan and a suspension bar secured to each of the plurality of mounting structures for mounting the lighting fixture assembly to adjacent ceiling joists.

4. The recessed lighting fixture assembly of claim 3, wherein the position of each of the plurality of mounting structures is adjustable relative to the pan and the position of each suspension bar is adjustable relative to each of the plurality of mounting structures.

5. A recessed lighting fixture assembly, comprising:

a. a pan extending in a first plane and having a pan opening; and b. a tray positioned at least partially within the pan opening; and c. a trim assembly engaged with the tray and positioned at least partially within the pan opening, wherein:

the tray is adjustable relative to the pan in a second plane parallel to the first plane from a first position to a second position, the tray comprises at least one aperture for receiving a fastener, the at least one aperture is sized to permit movement of the tray relative to the pan in the second plane in any direction relative to the first plane from the first position to the second position when at least a portion of the fastener is positioned within the at least one aperture, and the tray is securable in the second position, further comprising a plurality of mounting structures secured to the pan for mounting the lighting fixture assembly to adjacent ceiling joists.

6. A recessed lighting fixture assembly, comprising:

a. a pan extending in a first plane and having a pan opening; and b. a tray positioned at least partially within the pan opening; and c. a trim assembly engaged with the tray and positioned at least partially within the pan opening, wherein:

the tray is adjustable relative to the pan in a second plane parallel to the first plane from a first position to a second position the tray comprises at least one aperture for receiving a fastener, the at least one aperture is sized to permit movement of the tray relative to the pan in the second plane in any direction relative to the first plane from the first position to the second position when at least a portion of the fastener is positioned within the at least one aperture, and the tray is securable in the second position, further comprising a plurality of mounting structures secured to the pan and a suspension bar secured to each of the plurality of mounting structures for mounting the lighting fixture assembly to adjacent ceiling joists.

7. The recessed lighting fixture assembly of claim 6, wherein the position of each of the plurality of mounting structures is adjustable relative to the pan and the position of each suspension bar is adjustable relative to each of the plurality of mounting structures.

* * * * *